US010339078B2

(12) United States Patent
Nair et al.

(10) Patent No.: US 10,339,078 B2
(45) Date of Patent: Jul. 2, 2019

(54) SMART DEVICE AND METHOD OF OPERATING THE SAME

(71) Applicant: Samsung Electronics Co., Ltd., Suwon-si, Gyeonggi-do (KR)

(72) Inventors: Renju Chirakarotu Nair, Bangalore (IN); Prabhushetty Mulage, Bangalore (IN); Raman Jaiswal, Bangalore (IN); Rajib Basu, Bangalore (IN); Seong-sig Kang, Gwangmyeong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 89 days.

(21) Appl. No.: 15/225,030

(22) Filed: Aug. 1, 2016

(65) Prior Publication Data
US 2017/0153992 A1    Jun. 1, 2017

(30) Foreign Application Priority Data

Jul. 31, 2015   (IN) ........................... 3975/CHE/2015
Apr. 29, 2016   (IN) ........................... 3975/CHE/2015
Jul. 6, 2016    (KR) ....................... 10-2016-0085594

(51) Int. Cl.
*G06F 13/24*        (2006.01)
*G06F 3/0482*       (2013.01)
(Continued)

(52) U.S. Cl.
CPC ............ *G06F 13/24* (2013.01); *G06F 1/1694* (2013.01); *G06F 1/3203* (2013.01);
(Continued)

(58) Field of Classification Search
None
See application file for complete search history.

(56) References Cited

U.S. PATENT DOCUMENTS 6,529,144 B1 * 3/2003 Nilsen ................... G06F 1/1613
                                                    340/568.1
8,260,367 B2 * 9/2012 Chan ................. H04M 1/72566
                                                    340/7.58
(Continued)

FOREIGN PATENT DOCUMENTS

EP    2317744 A1       5/2011
EP    2683204 A1       1/2014
KR    20000074070 A  * 12/2000

OTHER PUBLICATIONS

'What Apple's M7 Motion-Sensing Chip Could Do' by David Talbot, Sep. 25, 2013.*
(Continued)

*Primary Examiner* — Steven G Snyder
(74) *Attorney, Agent, or Firm* — Jefferson IP Law, LLP

(57) ABSTRACT

A smart device and a method of operating the same are provided. The smart device includes a processor, and a sensor configured to detect movement of the smart device, generate an interrupt signal including information on a movement range corresponding to at least one movement type determined based on the detected movement, and output the interrupt signal to the processor and the processor is configured to control an action, corresponding to the interrupt signal received from the sensor, to be performed in response to the interrupt signal.

20 Claims, 16 Drawing Sheets

US 10,339,078 B2

Page 2

(51) Int. Cl.
  *G06F 3/0484* (2013.01)
  *G06F 1/16* (2006.01)
  *G06F 1/3203* (2019.01)
  *H04W 52/02* (2009.01)
  *G06F 3/0346* (2013.01)

(52) U.S. Cl.
  CPC .......... *G06F 3/0346* (2013.01); *G06F 3/0482* (2013.01); *G06F 3/0484* (2013.01); *H04W 52/0254* (2013.01); *Y02D 70/00* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/164* (2018.01); *Y02D 70/166* (2018.01); *Y02D 70/20* (2018.01); *Y02D 70/26* (2018.01)

(56) References Cited

U.S. PATENT DOCUMENTS

| | | | | |
|---|---|---|---|---|
| 8,509,755 | B2 * | 8/2013 | Dods | H04W 52/0251 |
| | | | | 455/418 |
| 8,952,895 | B2 * | 2/2015 | Moore | G06F 3/01 |
| | | | | 345/158 |
| 9,292,045 | B2 * | 3/2016 | Shultz | H04M 1/72522 |
| 9,342,154 | B2 * | 5/2016 | Nasiri | G06F 3/0346 |
| 9,367,145 | B2 * | 6/2016 | Sheynblat | G06F 1/1626 |
| 9,501,127 | B2 * | 11/2016 | Oh | G06F 1/3206 |
| 9,571,714 | B2 * | 2/2017 | Shultz | H04M 1/72522 |
| 2005/0246098 | A1 | 11/2005 | Bergstrom et al. | |
| 2006/0161377 | A1 * | 7/2006 | Rakkola | G01P 13/00 |
| | | | | 702/141 |
| 2009/0156172 | A1 * | 6/2009 | Chan | H04M 1/72566 |
| | | | | 455/412.2 |
| 2010/0149121 | A1 | 6/2010 | Alexander et al. | |
| 2011/0105096 | A1 * | 5/2011 | Dods | H04W 52/0251 |
| | | | | 455/418 |
| 2012/0007713 | A1 * | 1/2012 | Nasiri | G06F 1/1694 |
| | | | | 340/5.81 |
| 2012/0016641 | A1 | 1/2012 | Raffa et al. | |
| 2012/0306770 | A1 * | 12/2012 | Moore | G06F 3/01 |
| | | | | 345/173 |
| 2013/0090151 | A1 | 4/2013 | Ngai et al. | |
| 2013/0265225 | A1 | 10/2013 | Nasiri et al. | |
| 2014/0059365 | A1 | 2/2014 | Heo et al. | |
| 2014/0068306 | A1 * | 3/2014 | Oh | G06F 1/3206 |
| | | | | 713/323 |
| 2014/0165722 | A1 | 6/2014 | Roselli et al. | |
| 2014/0232633 | A1 * | 8/2014 | Shultz | H04M 1/72522 |
| | | | | 345/156 |
| 2014/0260704 | A1 | 9/2014 | Lloyd et al. | |
| 2014/0267006 | A1 | 9/2014 | Raffa et al. | |
| 2014/0267431 | A1 * | 9/2014 | Sheynblat | G06F 1/1626 |
| | | | | 345/659 |
| 2014/0354527 | A1 * | 12/2014 | Chen | G06F 3/017 |
| | | | | 345/156 |
| 2015/0029093 | A1 | 1/2015 | Feinstein | |
| 2015/0042554 | A1 | 2/2015 | Chen et al. | |
| 2015/0193006 | A1 * | 7/2015 | Nasiri | G06F 3/0346 |
| | | | | 341/20 |
| 2016/0301843 | A1 * | 10/2016 | Shultz | H04M 1/72522 |
| 2017/0102787 | A1 * | 4/2017 | Gu | G06F 3/0346 |
| 2018/0286213 | A1 * | 10/2018 | Schueler | H04W 52/0216 |

OTHER PUBLICATIONS

'Droid Turbo User's Guide' copyright 2014, Motorola Mobility LLC.*
'How to use motion features on your Samsung Galaxy S3' by John Thompson, CNET, Jul. 2, 2012.*
'How to Enable (or Disable) Motion & Fitness Tracking with iPhone' OSXDaily, Apr. 5, 2015.*
'How to enable motion and gesture controls on the Galaxy Note 4' by Gary Marshall, androidpit, Mar. 21, 2015.*
Esfandyari et al., Applying the Interrupt Features of a MEMS Accelerometer, Planet Analog, Dec. 16, 2011.
European Search Report dated Apr. 3, 2018, issued in European Patent Application No. 16833246.8—1221.

* cited by examiner

TILT ANGLE

ROTATION ANGLE

SMART DEVICE AND METHOD OF OPERATING THE SAME

CROSS-REFERENCE TO RELATED APPLICATION(S)

This application claims the benefit under 35 U.S.C. § 119(a) of an Indian Provisional application filed on Jul. 31, 2015 in the Indian Patent Office and assigned Serial number 3975/CHE/2015, of an Indian patent application filed on Nov. 27, 2015 in the Indian Patent Office and assigned Serial number 3975/CHE/2015, and of a Korean patent application filed on Jul. 6, 2016 in the Korean Intellectual Property Office and assigned Serial number 10-2016-0085594, the entire disclosure of each of which is hereby incorporated by reference.

TECHNICAL FIELD

The present disclosure relates to electronic apparatuses and methods of operating the same. More particularly, the present disclosure relates to an electronic apparatus for displaying a graphic user interface (GUI) element, and a method of operating the electronic apparatus.

BACKGROUND

An accelerometer sensor is one of commonly used motion sensors and is used in various solutions, such as for a pedometer, screen rotation, automatic brightness, and free fall detection. Algorithms in all such cases require accelerometer data to be polled not only at 100 Hz, but also at 5 Hz, 16 HZ, and 50 Hz.

A device having a sensor operates using the following two methods.

First, a sensor is connected to an application processor (AP). The AP is in a wake up state to receive data and periodically polls the sensor.

Second, a sensor is connected to a microcontroller (MCU, i.e., a sensor hub). An AP may sleep and the may be sleepwalking. Processing may occur in the MCU, and the MCU may wake up the AP when necessary. Here, the MCU periodically polls the sensor.

A major disadvantage of such a polling method is that a system requires uninterrupted polling of accelerometer data either from an AP or from an MCU. As a result, there is a possibility that battery performance may largely deteriorate because such a polling method requires a huge amount of processing and continuous polling with respect to a sensor and the sensor needs to operate in a normal mode. Latency in data is another big problem in an MCU-based method. Accelerometer data may be available to an upper layer through a polling mechanism and is used in the upper layer for decision making for all algorithms. Due to the polling mechanism and complex decision making processes accompanied by mathematical operations or signal processing, sluggish behavior may be generated, and thus it may be impossible to receive real-time responses.

In existing architecture, accelerometer data is transmitted to an application layer by using a polling mechanism. Such an operation is intensive for a central processing unit (CPU), and thus a data receiving rate is reduced. Most applications access data by using the polling mechanism. In other words, the data is processed in an uppermost layer and then necessary actions to be taken are determined according to algorithms. Accordingly, a possibility of a high-speed response is reduced in cases where a fall is detected. Due to the polling mechanism, CPU million instructions per second (MIPS) are wasted and thus power consumption is increased.

Accordingly, there is a need for a method for a high-speed dynamic response of a smart device, which provides an instant alert and does not require a polling mechanism.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a smart device for reducing power consumption and enabling a fast response, and a method of operating the smart device.

Additional aspects will be set forth in part in the description which follows and, in part, will be apparent from the description, or may be learned by practice of the presented embodiments.

In accordance with an aspect of the present disclosure, a smart device is provided. The smart device includes a processor, and a sensor configured to detect movement of the smart device, generate an interrupt signal including information on a movement range corresponding to at least one movement type determined based on the detected movement, and output the interrupt signal to the processor and the processor is configured to control an action, corresponding to the interrupt signal received from the sensor, to be performed in response to the interrupt signal.

The information on the movement range included in the interrupt signal may include at least one of an identifier indicating the at least one movement type, or a value indicating the movement range corresponding to a direction or magnitude of the movement.

The sensor may include one or more algorithms, and may be configured to determine each of the at least one movement type, in which the one or more algorithms may each be settable to be enabled or disabled.

The one or more algorithms may each be settable to be enabled or disabled according to a user setting received from a user interface.

The processor may be further configured to wake up from a low power mode to a normal mode in response to the interrupt signal received from the sensor.

The sensor may be further configured to calculate at least one of a tilt angle or a rotation angle of the smart device based on sensing data from detecting the movement of the smart device, evaluate at least one of the tilt angle or the rotation angle based on at least one of a rotation angle table or a tilt angle table, which is pre-stored, and generate the interrupt signal including the information on the movement range based on a result of an evaluation.

The rotation angle table may include a range value corresponding to the rotation angle, and the tilt angle table may include a range value corresponding to the tilt angle.

In accordance with another aspect of the present disclosure, a method of operating a smart device is provided. The method includes detecting, by a sensor, movement of the smart device, generating an interrupt signal including information on a movement range corresponding to at least one movement type determined based on the movement, outputting the interrupt signal to a processor and controlling, by the processor, an action, corresponding to the interrupt signal, to be performed in response to the interrupt signal received from the sensor.

According to an aspect of another embodiment, a non-transitory computer-readable recording medium has recorded thereon a program code for executing the method.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While such terms as "first", "second", etc., may be used to describe various components, such components must not be limited to the above terms. The above terms are used only to distinguish one component from another. For example, a first component may be referred to as a second component, and similarly, a second component may be referred to as a first component while not departing from the scope of the present disclosure. As used herein, the term "and/or" includes any and all combinations of one or more of the associated listed items. Expressions such as "at least one of", when preceding a list of elements, modify the entire list of elements and do not modify the individual elements of the list.

In the present specification, it is to be understood that terms such as "including" or "having", etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Hereinafter, embodiments will now be described with reference to accompanying drawings.

Figure 1:
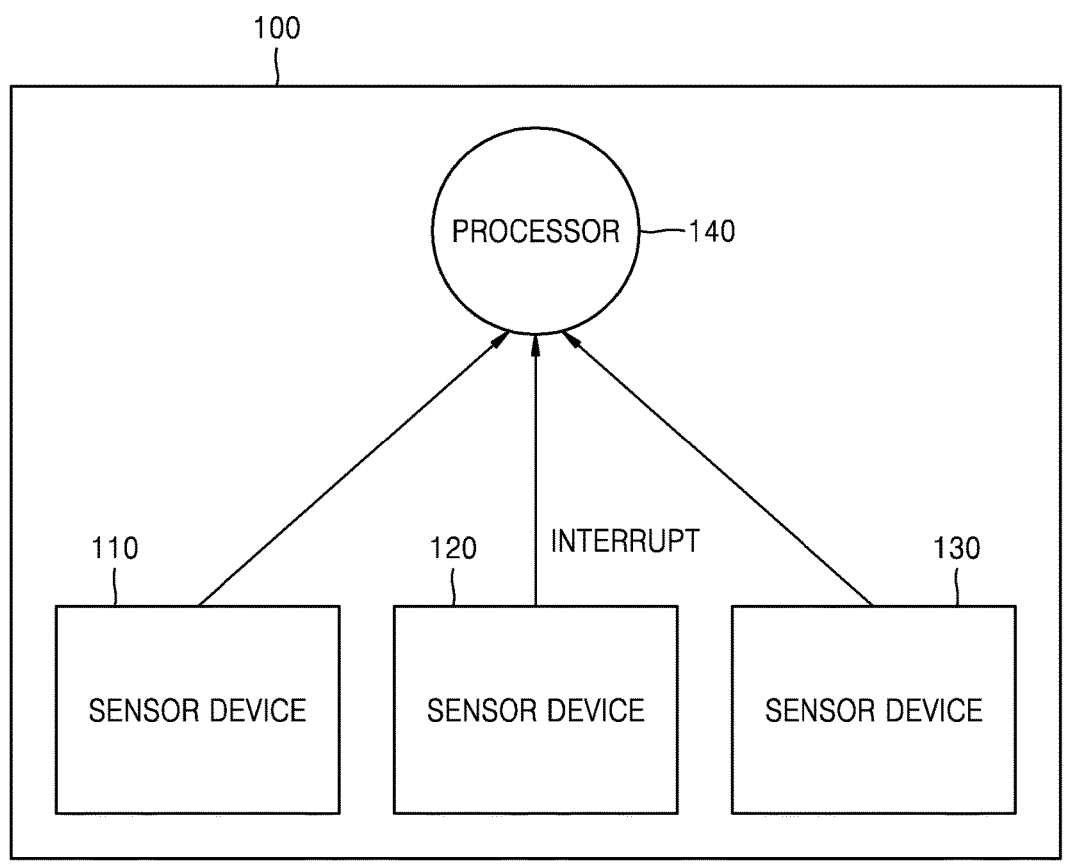
FIG. 1 is a reference diagram of an example for describing a concept according to an embodiment of the present disclosure.

FIG. 1 is a reference diagram of an example for describing a concept according to an embodiment of the present disclosure.

Referring to FIG. 1, a smart device 100 according to an embodiment includes sensor devices 110 through 130, and a processor 140.

The smart device 100 may include one or more sensor devices. In FIG. 1, for example, three sensor devices 110 through 130 are shown, but the number of sensor devices may be one or more.

The sensor devices 110 through 130 may include a sensor for detecting movement of the smart device 100, and a small scale processor or small scale circuit for generating and processing an interrupt signal. In the present specification, a sensor device including a sensor and a small scale processor or small scale circuit may also be simply referred to as a sensor.

At least one of the sensor devices 110 through 130 may detect movement of the smart device 100, generate an interrupt signal corresponding to the movement, and transmit the interrupt signal to the processor 140.

According to an embodiment, at least one of the sensor devices 110 through 130 may detect the movement of the smart device 100, and generate an interrupt signal including information on a movement range corresponding to at least one movement type determined based on the movement.

According to an embodiment, the information on the movement range included in the interrupt signal may include at least one of an identifier including the movement type, and a value indicating the movement range corresponding to a direction or magnitude of the movement.

According to an embodiment, each of the sensor devices 110 through 130 includes one or more modules determining each movement type, and the one or more modules may each be set to be enabled or disabled. Also, the one or more modules may each be set to be enabled or disabled according to a user setting received from a user interface.

According to an embodiment, each of the sensor devices 110 through 130 may calculate at least one of a tilt angle and a rotation angle of the smart device 100 based on sensing data from detecting the movement of the smart device 100, evaluate at least one of the tilt angle and the rotation angle based on at least one of a rotation angle table and a tilt angle table, which is pre-stored, and generate the interrupt signal including the information on the movement range based on a result of the evaluation.

According to an embodiment, the rotation angle table may include a range value corresponding to one or more rotation angles, and the tilt angle table may include a range value corresponding to one or more tilt angles.

The processor 140 processes overall operations of the smart device 100, wherein the processor 140 may receive an interrupt signal from at least one of the sensor devices 110 through 130 while the processor 140 is in a low power mode, and wake up from the low power mode to a normal mode in response to the interrupt signal. Also, the processor 140 may perform one or more actions corresponding to the interrupt signal.

The one or more actions corresponding to the interrupt signal may include, for example, displaying of a certain message or a certain user interface on a display, outputting of a certain alarm, and transmitting of a notification to a certain destination, and may include any action performable by using a module included in the smart device 100.

The processor 140 may include an application processor (AP).

According to a structure shown in FIG. 1, unlike a general processor that is in a wake up state to poll a sensor to periodically detect movement, at least one of the sensor devices 110 through 130 actively wakes up the processor 140 in a low power mode when movement is detected, and thus power consumption of the processor 140 is reduced and a load of the processor 140 that is generally always polling may be reduced.

The smart device 100 according to various embodiments may be a device having a communication function. For example, the smart device 100 may include at least one of a smart phone, a tablet personal computer (PC), a mobile phone, a video phone, an e-book reader, a desktop PC, a laptop PC, a netbook computer, a personal digital assistant (PDA), a portable multimedia player (PMP), a Moving Picture Experts Group phase 1 or phase 2 (MPEG-1 or MPEG-2) audio layer 3 (MP3) player, a mobile medical device, a camera, and a wearable device (for example, a head-mounted device (MID) like electronic glasses, an electronic dress, an electronic bracelet, an electronic necklace, an electronic accessory, an electronic tattoo, or a smart watch).

The smart device 100 according to various embodiments may be one of various devices described above, or a combination thereof. Also, the smart device 100 according to various embodiments may be a flexible device. Also, it would be obvious to one of ordinary skill in the art that the smart device 100 according to various embodiments is not limited to the above devices.

Figure 2:
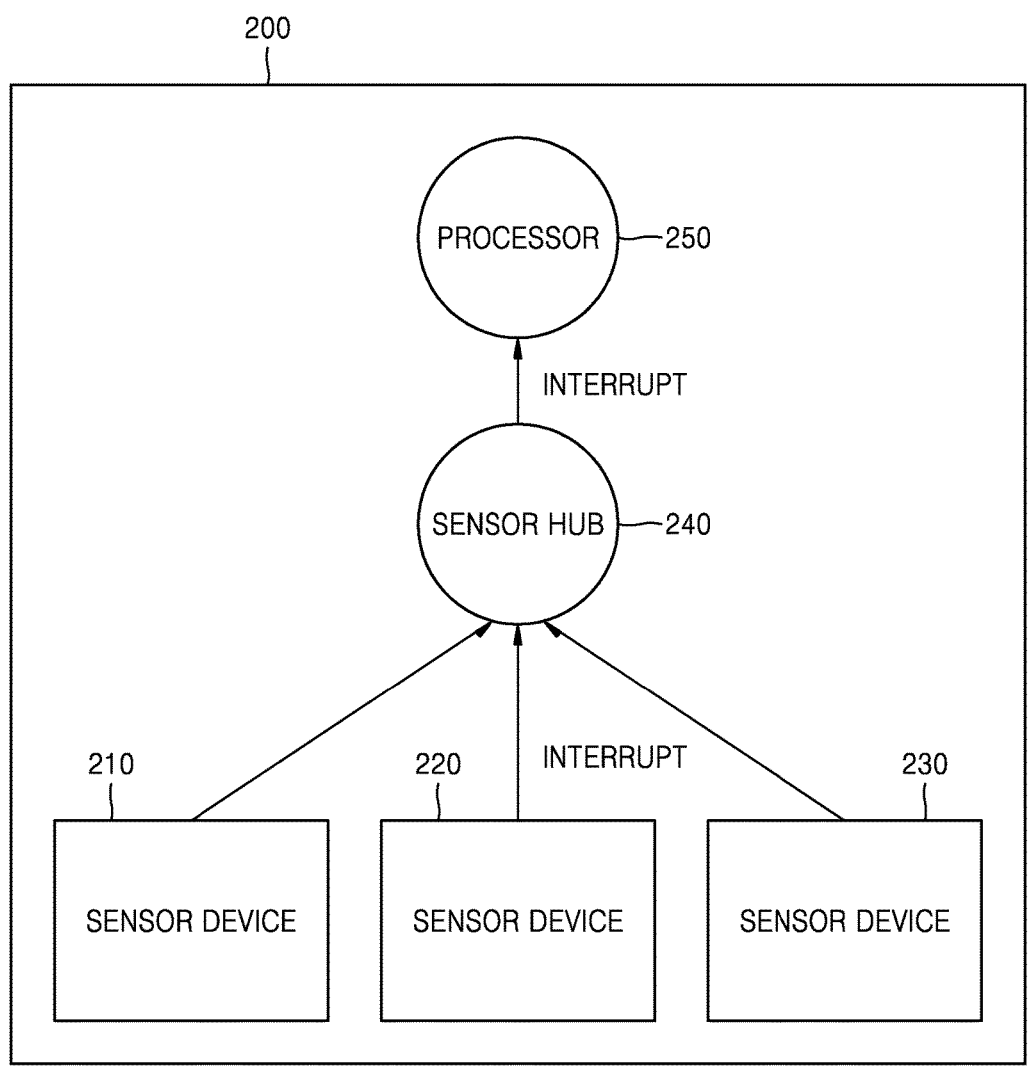
FIG. 2 is a reference diagram of another example for describing concept according to an embodiment of the present disclosure.

FIG. 2 is a reference diagram of another example for describing concept according to an embodiment of the present disclosure.

Referring to FIG. 2, a smart device 200 according to an embodiment includes sensor devices 210 through 230, a sensor hub 240, and a processor 250.

The sensor devices 210 through 230 and the processor 250 perform the same operations as those shown in FIG. 1, and a difference between the smart device 100 of FIG. 1 and the smart device 200 of FIG. 2 is that the smart device 200 further includes the sensor hub 240.

The sensor hub 240 is also referred to as a sensor sub-system, and manages the sensor devices 210 through 230.

The sensor hub 240 may wake up and enter into a normal mode upon receiving an interrupt signal from at least one of the sensor devices 210 through 230 while the sensor hub 240 is in a low power mode, manage the interrupt signal, and transmit the interrupt signal to the processor 250 in a low power mode. The processor 250 may wake up from the low power mode upon receiving the interrupt signal from the sensor hub 240, and perform one or more actions corresponding to the interrupt signal.

Figure 3:
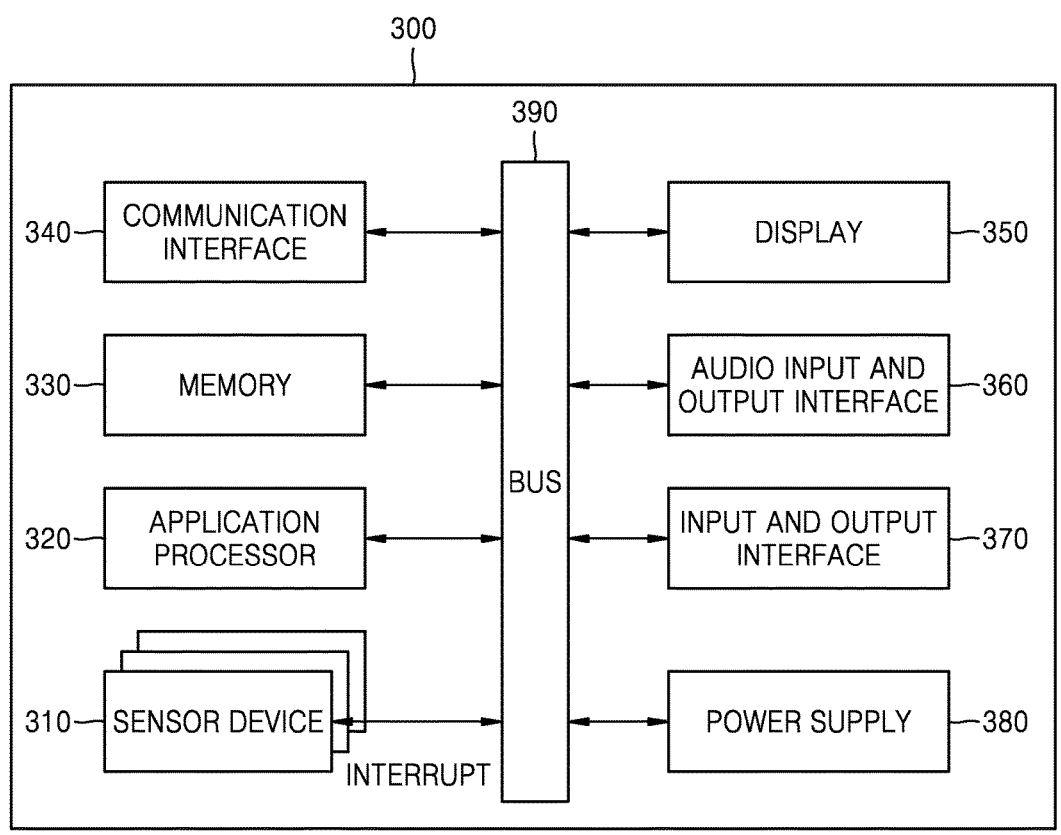
FIG. 3 is a block diagram of a smart device according to an embodiment of the present disclosure.

FIG. 3 is a block diagram of a smart device 300 according to an embodiment of the present disclosure.

Referring to FIG. 3, a smart device according to an embodiment includes a sensor device 310, an AP 320, a memory 330, a communication interface 340, a display 350, an audio input and output interface 360, an input and output interface 370, and a power supply 380.

The sensor device 310 may measure a physical quantity or detect an operation state of the smart device 300, and convert measured or detected information to an electric signal. The sensor device 310 may include, for example, at least one of a gesture sensor, a gyro sensor, an atmospheric sensor, a magnetic sensor, an acceleration sensor, a grip sensor, a proximity sensor, a color sensor, a biometric sensor, a temperature/humidity sensor, an illumination sensor, and an ultraviolet (UV) sensor. In addition or alternatively, the sensor device 310 may include, for example, an e-nose sensor, an electromyography (EMG) sensor, an electroencephalogram (EEG) sensor, an electrocardiogram (ECG) sensor, an infrared ray (IR) sensor, an iris sensor, or a fingerprint sensor.

According to an embodiment, the sensor device 310 may further include a control circuit for controlling at least one sensor included in the sensor device 310.

According to an embodiment, the sensor device 310 may measure the physical quantity of the smart device 300 even in a lower power mode of the smart device 300, generate an interrupt signal according to the measurement, and transmit the interrupt signal to the AP 320 in a low power mode.

According to an embodiment, the sensor device 310 may detect a tilt angle or a rotation angle of the smart device 300.

The AP 320 may, for example, receive a command from another component described above (for example, the memory 330, the input and output interface 370, the display 350, or the communication interface 340) through a bus 390, decode the command, and perform a data process or an operation according to the command.

The AP 320 may control a plurality of hardware or software components connected to the AP 320 by driving an operating system (OS) or an application program, and perform various data processes and operations including multimedia data. The AP 320 may be, for example, realized as a system-on-chip (SoC). According to an embodiment, the AP 320 may further include a graphics processing unit (GPU).

According to an embodiment, the AP 320 may receive an interrupt signal from the sensor device 310 while the AP 320 is in a low power mode, and wake up from the low power mode to a normal mode in response to the interrupt signal. Also, the AP 320 may perform one or more actions corresponding to the interrupt signal, in response to the interrupt signal. The one or more actions performed by the AP 320 according to the interrupt signal may be stored in the memory 330.

The one or more actions may include, for example, transmitting a notification to another device through the communication interface 340, turning on the display 350 and outputting a certain message or a certain user interface to the display 350, turning on the audio input and output interface 360 and outputting a certain sound, and inputting and outputting data by using the input and output interface 370.

The memory 330 may store a command or data received from or generated by the AP 320 or another component (for example, the input and output interface 370, the display 350, or the communication interface 340). The memory 330 may include, for example, program modules, such as a kernel, middleware, an application programming interface (API), and an application. Each programming module may include software, firmware, hardware, or a combination thereof. The memory 330 may include an internal memory or an external memory. The internal memory may include, for example, at least one of a volatile memory (for example, a dynamic random access memory (DRAM), a static RAM (SRAM), or a synchronous DRAM (SDRAM)), and a non-volatile memory (for example, a one-time programmable read-only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory).

According to an embodiment, the external memory may include a flash drive, and may further include, for example, a compact flash (CF) card, a secure digital (SD) card, a micro-SD card, a mini-SD card, an extreme digital (xD) card, or a memory stick.

According to an embodiment, the memory 330 may include a table in which a plurality of interrupt signals and one or more actions performed according to an interrupt signal are mapped and defined.

The communication interface 340 may connect the smart device 300 and an external apparatus for communication. For example, the communication interface 340 may be connected to a network through wireless communication or wired communication to communicate with the external apparatus. The wireless communication may include, for example, at least one of Wi-Fi, Bluetooth (BT), near field communication (NFC), global positioning system (GPS), and cellular communication (for example, long-term evolution (LTE), LTE-advanced (LTE-A), code division multiple access (CDMA), wideband CDMA (WCDMA), universal mobile telephone system (UMTS), wireless broadband (Wi-Bro), or global system for mobile communication (GSM)). The wired communication may include, for example, at least one of universal serial bus (USB), high-definition multimedia interface (HDMI), recommended standard 232 (RS-232), and plain old telephone service (POTS).

The display 350 may display various types of information (for example, multimedia data or text data) for a user.

The audio input and output interface 360 may convert sound and an electric signal in bi-directions, and for example, process sound information input or output through, for example, a speaker, a receiver, an earphone, or a microphone.

The input and output interface 370 may transmit a command or data input by the user through an input and output device (for example, a sensor, a keyboard, or a touch screen) to, for example, the AP 320, the memory 330, or the communication interface 340 through the bus 390.

The power supply 380 may manage power of the smart device 300. Although not illustrated, the power supply 380 may include, for example, a power management integrated circuit (PMIC), a charger IC, or a battery or fuel gauge.

The bus 390 may be a circuit that connects the above components to each other and transfer a communication (for example, a control message) between the components.

Each of the components of the smart device 300 according to various embodiments may include one or more parts, and a name of component may vary according to types of the smart device 300. The smart device 300 according to various embodiments may include at least one of the above components, and may include more or less components than those shown in FIG. 3. Also, some of the components of the smart device 300 according to various embodiments may be combined to form one entity and perform functions of some components that are combined.

Figure 4:
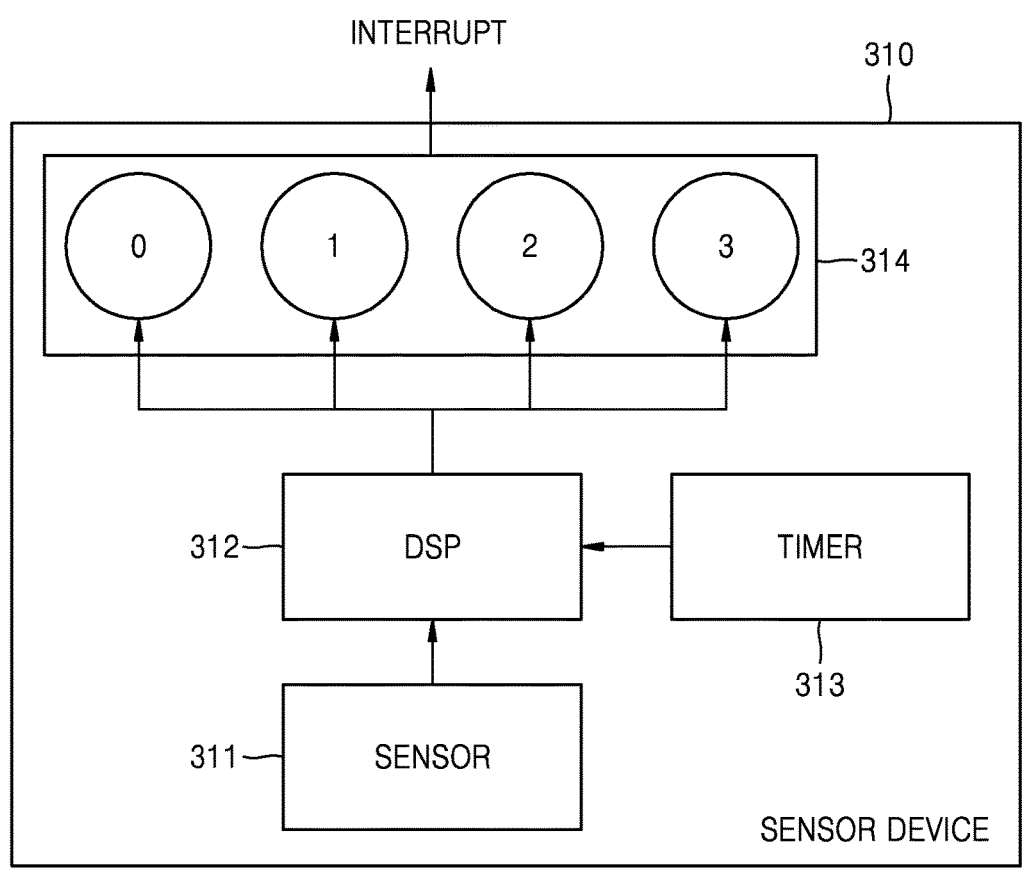
FIG. 4 is a block diagram illustrating in detail a sensor device of FIG. 3 according to an embodiment of the present disclosure.

FIG. 4 is a block diagram illustrating in detail a sensor device of FIG. 3 according to an embodiment of the present disclosure.

Referring to FIG. 4, the sensor device 310 includes a sensor 311, a digital signal processor (DSP) 312, a timer 313, and one or more registers 314.

The sensor 311 detects movement of the smart device 300 or a physical quantity of the smart device 300.

The DSP 312 receives detection data from the sensor 311, determines whether the detection data is valid to generate an interrupt signal by using the timer 313, generates the interrupt signal based on a result of the determination, and stores the interrupt signal in the register 314.

For example, an interrupt signal may be stored in two registers. From among the two registers, an algorithm identifier may be stored in a first register and an interrupt state may be stored in a second register. The interrupt state may include, for example, a value related to a pre-set algorithm for a pre-defined action including, but not limited to, screen rotation of a smart device, a pedometer, free fall detection, shaking detection, or sharp turn detection. The interrupt signal includes meaningful results and no further processing is required for making decisions.

For example, the algorithm identifier stored in the first register may indicate auto rotation, and the interrupt state stored in the second register may include a value indicating a direction of rotation.

For example, the algorithm identifier stored in the first register may indicate a pedometer and the interrupt state stored in the second register may include a value indicating the number of steps.

Figure 5:
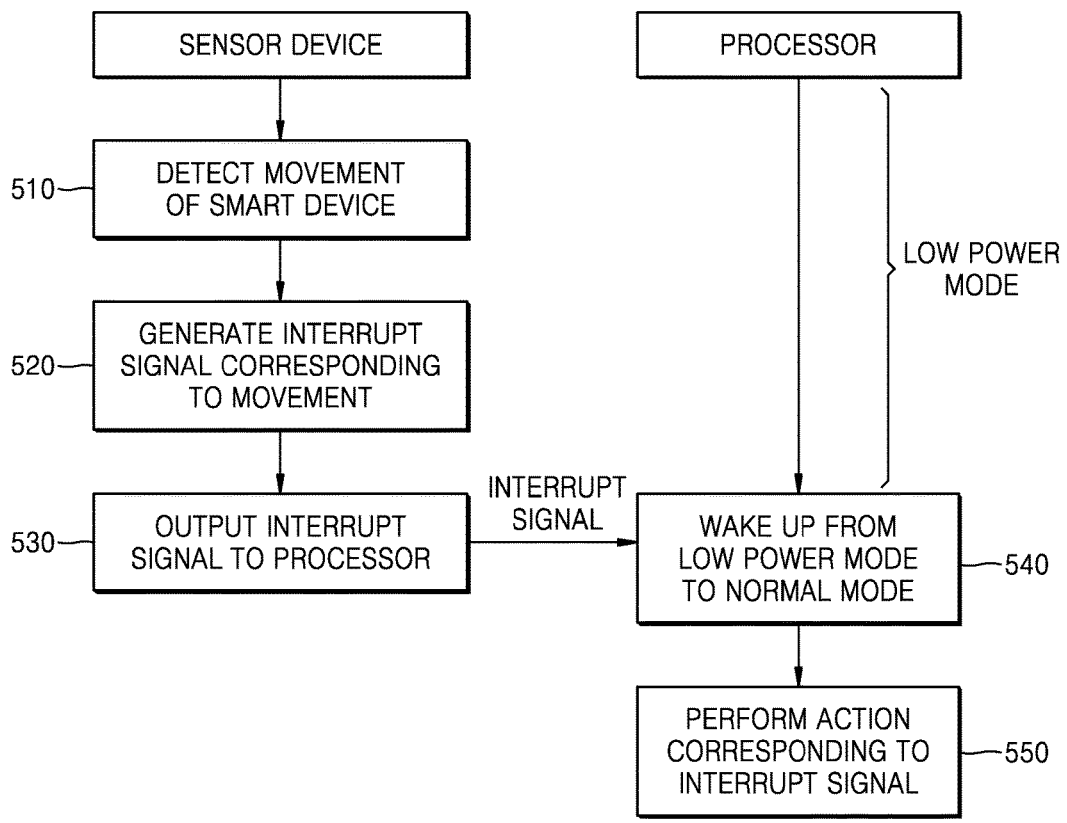
FIG. 5 is a flowchart of operations of a smart device according to an embodiment of the present disclosure.

FIG. 5 is a flowchart of operations of a smart device according to an embodiment of the present disclosure.

Referring to FIG. 5, in operation 510, a sensor device of the smart device detects movement of the smart device.

The sensor device generates an interrupt signal corresponding to the movement in operation 520, and outputs the interrupt signal to a processor in operation 530.

In operation 540, the processor in a low power mode receives the interrupt signal from the sensor device, and wakes up from the low power mode to a normal mode in response to the interrupt signal.

In operation 550, the processor performs an action corresponding to the interrupt signal.

In the operations of FIG. 5, the sensor device detects the movement of the smart device, but an embodiment is not limited thereto. A sensor included in the sensor device may not only be a sensor measuring movement of the smart device, but also a sensor measuring any value. For example, the sensor included in the sensor device may be a sensor measuring biometric information. For example, a sensor included in a wearable smart device worn by a user and measuring biometric information may detect biometric information of the user. Here, when the biometric information of the user indicates an emergency, a sensor device may transmit an interrupt signal to a processor and the processor may perform an action corresponding to the emergency upon receiving the interrupt signal. The action corresponding to the emergency may include, for example, transmitting a message to a hospital, an emergency medical treatment center, or a pre-set user.

Figure 6:
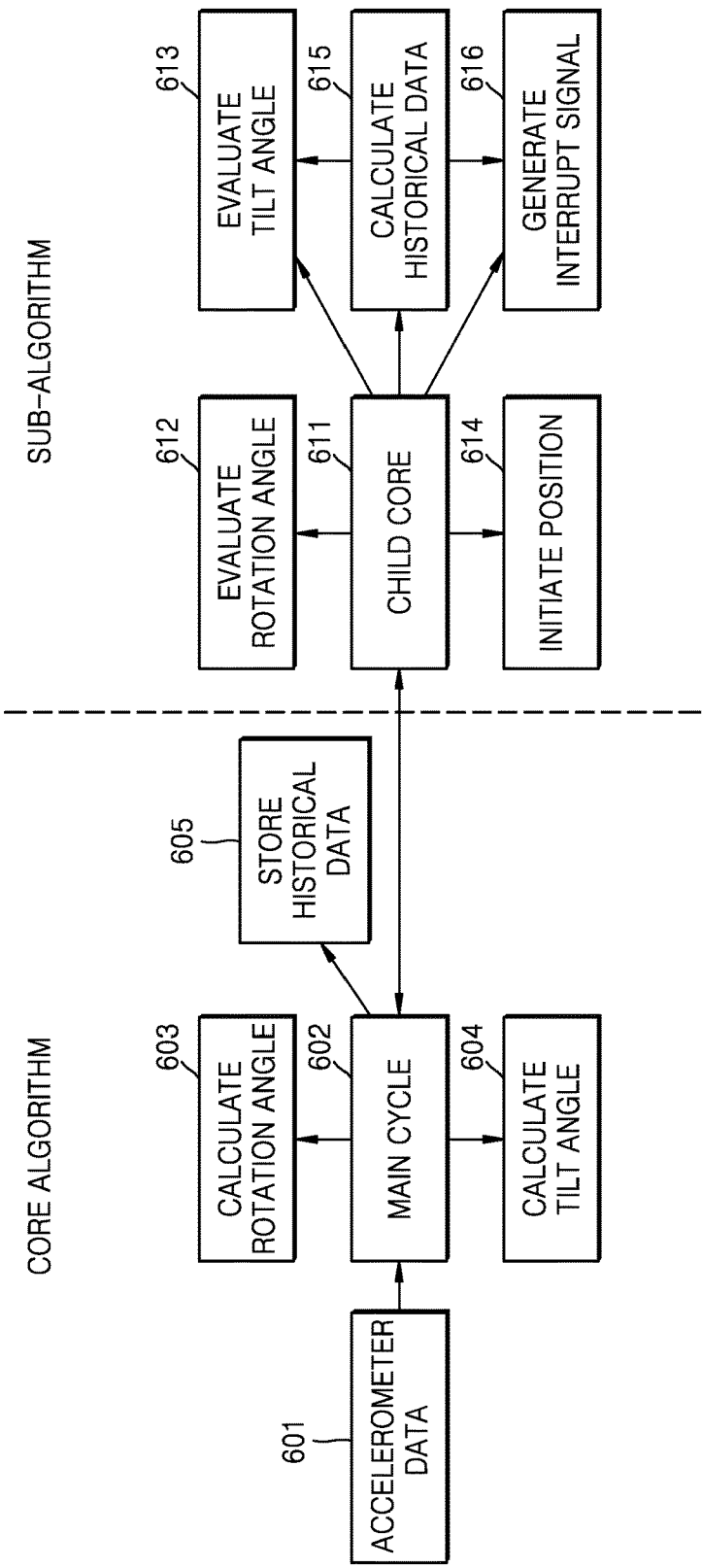
FIG. 6 illustrates examples of algorithms executed in a smart device according to an embodiment of the present disclosure.

FIG. 6 illustrates examples of algorithms executed in a smart device according to an embodiment of the present disclosure.

Referring to FIG. 6, the algorithms according to an embodiment include a core algorithm for a parent module and a child module for one or more sub-algorithms. The parent module tracks current accelerometer data 601, a rotation angle 603, a tilt angle 604, and pre-stored accelerometer historical data 605, according to a main cycle 602.

The child module through child core 611 generates an interrupt signal by using the rotation angle 603 and the tilt angle 604 together with the pre-stored accelerometer historical data 605, in block 616. When the interrupt signal 615 is generated, a register is updated to an identification (ID) of an algorithm that generated the interrupt signal and to an interrupt number.

The child module may initialize the position in block 614, calculate history data in block 615, and evaluate a tilt angle when a change of the tilt angle 613 maintained in a pre-defined region for a pre-determined period of time is determined, in block 613.

The child module may evaluate a rotation angle when a change of the rotation angle maintained in a pre-defined region for a pre-determined period of time is determined, in block 612.

According to an embodiment, an accelerometer algorithm may be related to screen rotation of a smart device, a pedometer, free fall detection, shaking detection, or sharp turn detection, but is not limited thereto.

According to an embodiment, a method of executing a group of accelerometer algorithms as a part of firmware of an accelerometer sensor chip may be provided. When the rotation angle 603 and the tilt angle 604 are identified and a request is received from the child module, the parent module shares the rotation angle 603 and the tilt angle 604 with the child module. Accelerometer data in a child thread from a firmware loop is evaluated, and an enabled algorithm is executed. All algorithms executed in a hardware chip generate various interrupt signals based on respective events according to the algorithms. Also, a plurality of child algorithms are executed together with a parent algorithm, and accelerometer activity is calculated by using sensor historical data, based on a current rotation angle and tilt angle. A generated interrupt signal is transmitted to an AP.

Figure 7:
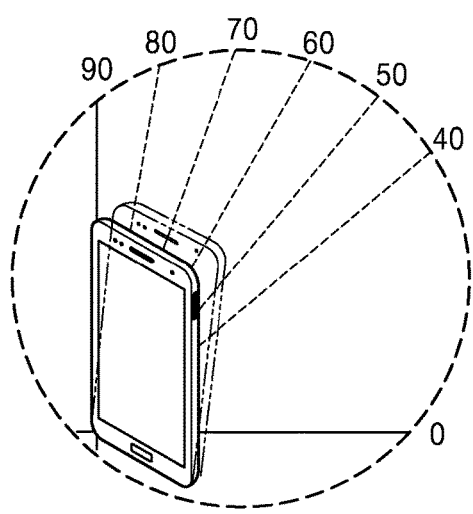
FIG. 7 is a reference diagram for describing a tilt angle and a rotation angle according to an embodiment of the present disclosure.
Figure 7:
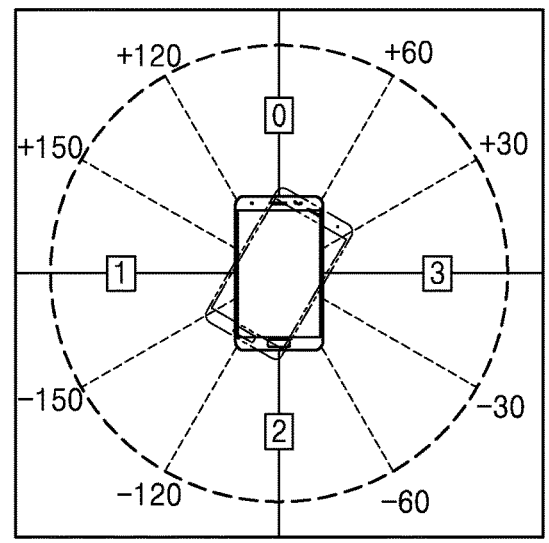

FIG. 7 is a reference diagram for describing a tilt angle and a rotation angle according to an embodiment of the present disclosure.

Referring to FIG. 7, the tilt angle indicates a degree of tilt of a smart device relative to a certain reference position, and the rotation angle indicates by how much the smart device is rotated from the certain reference position. When the rotation or tilt angle of the smart device is detected, the rotation or tilt angle is verified to check if it is valid. When it is determined that the rotation or tilt angle is valid, an interrupt signal is generated based on an executed algorithm and an occurred event.

Tilt angle data of the smart device may be calculated based on a gravity component of one or more accelerometer sensors.

Rotation angle data of the smart device may be calculated based on an X-axis value, a Y-axis value, and a Z-axis value of the accelerometer sensor.

Figure 8A:
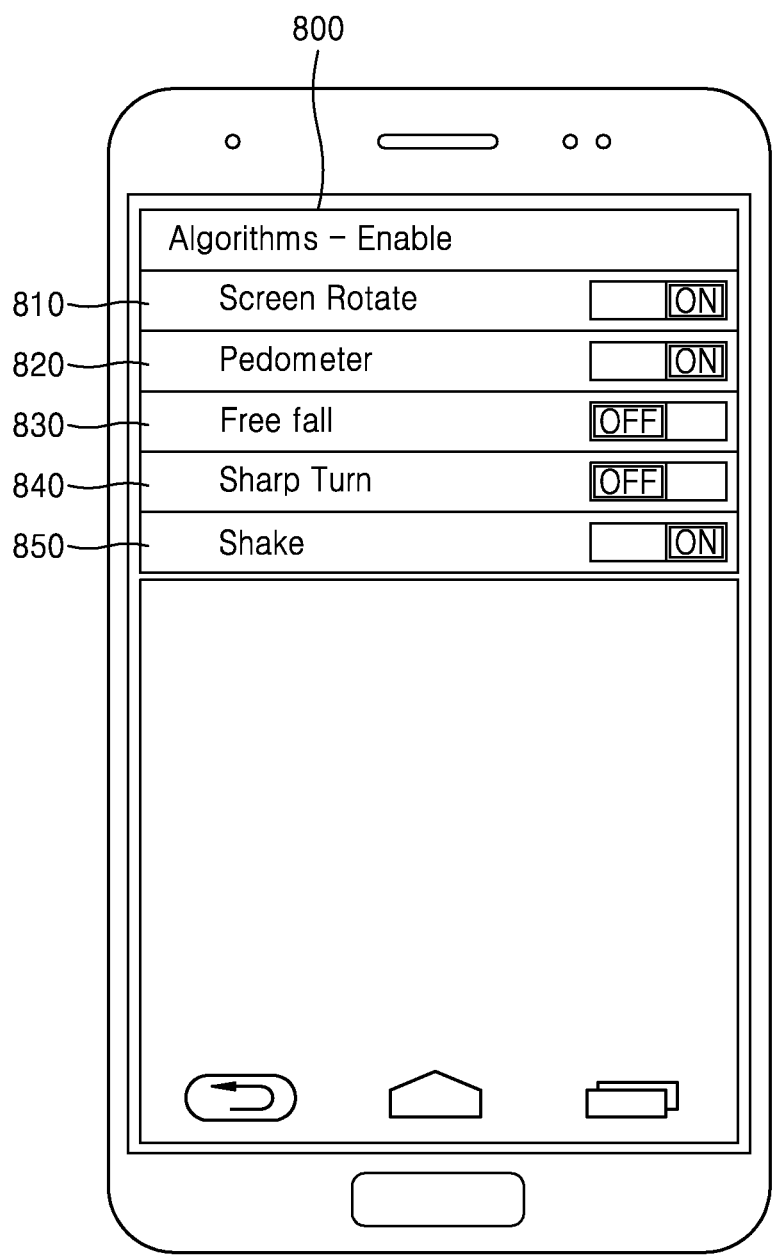
FIGS. 8A, 8B, and 8C are reference diagrams for describing a method of operating a smart device for turning on or off a functionality related to a motion sensor according to algorithms according to various embodiments of the present disclosure.
Figure 8B:
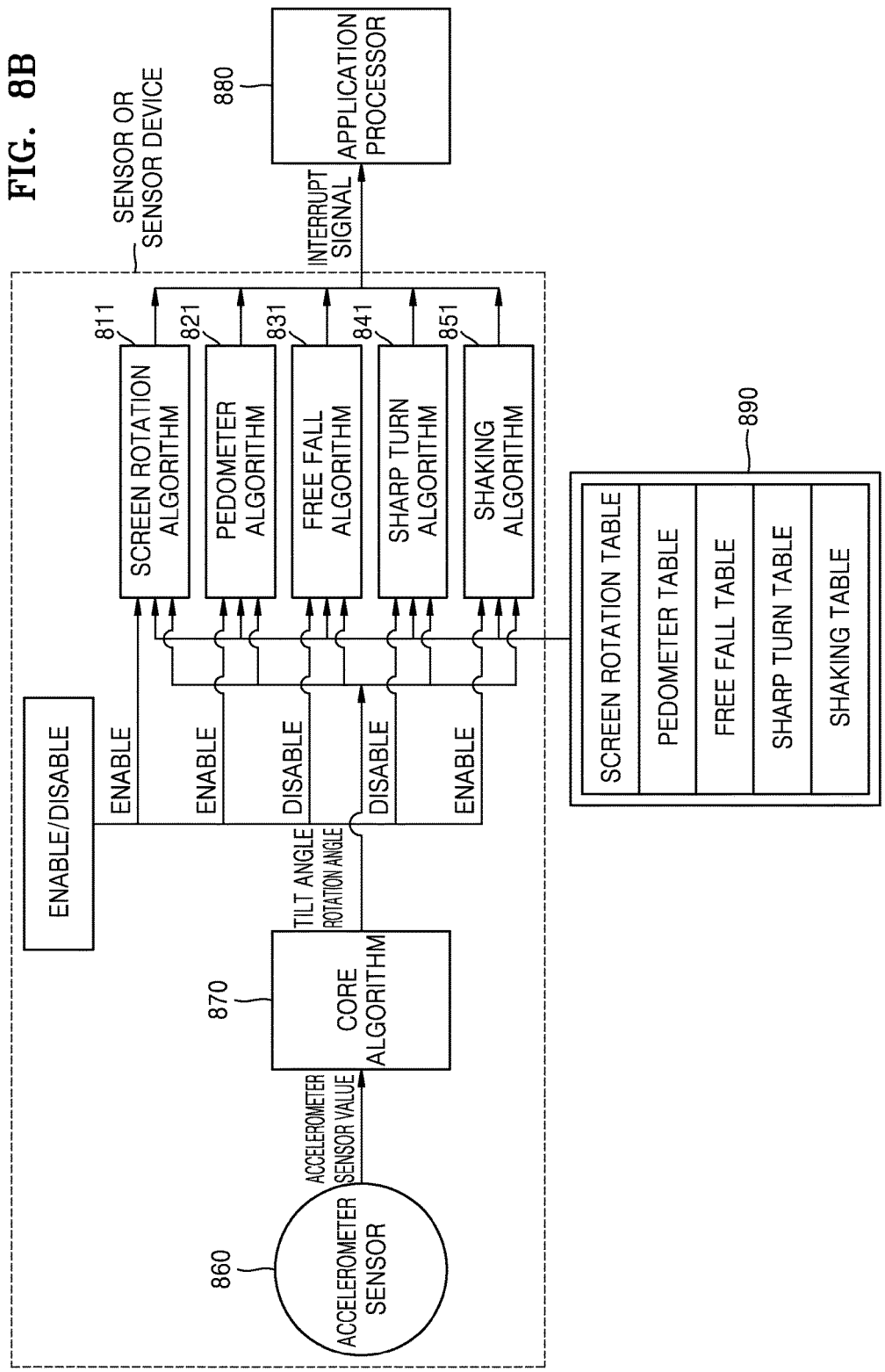
Figure 8C:
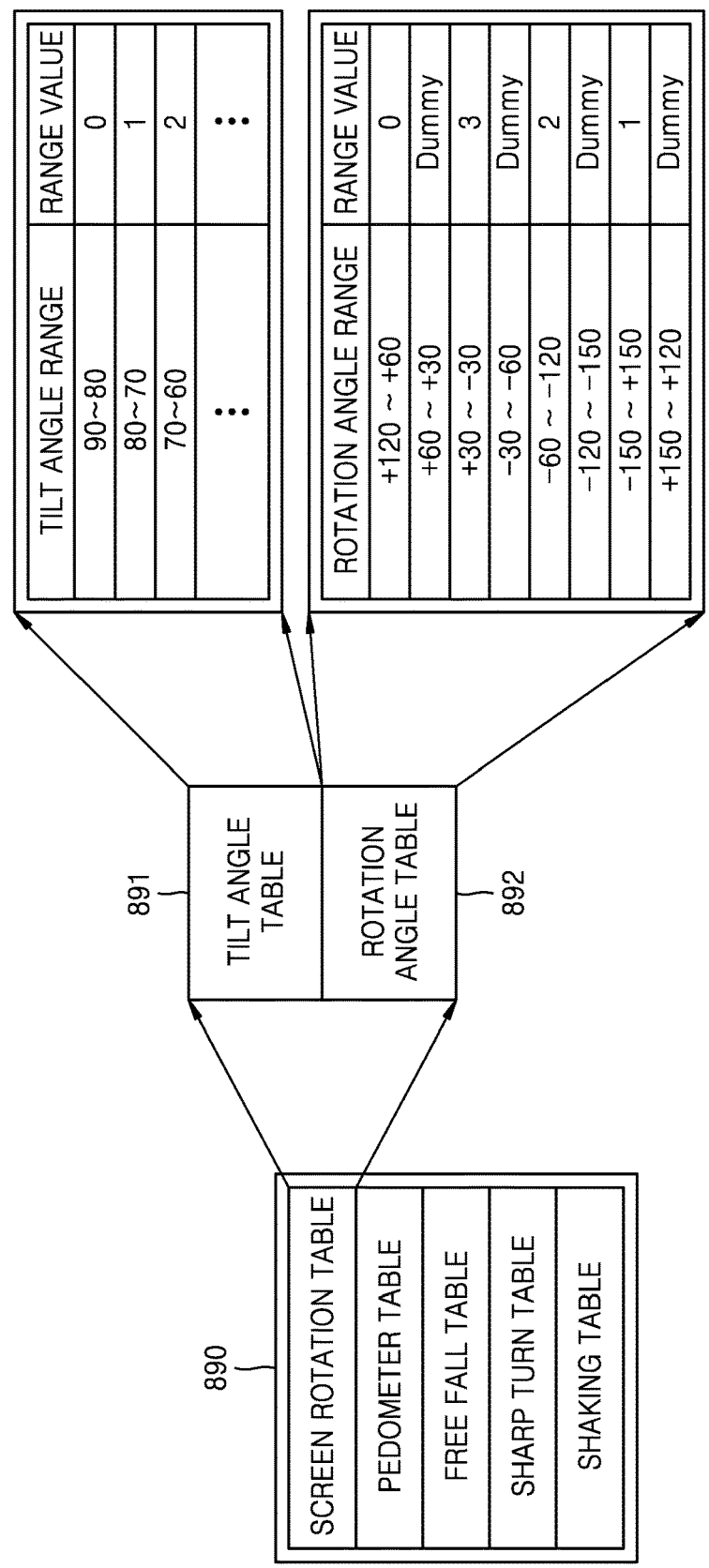

FIGS. 8A, 8B, and 8C are reference diagrams for describing a method of operating a smart device for turning on or off a functionality related to a motion sensor according to algorithms according to various embodiments of the present disclosure.

FIG. 8A illustrates an example of a user interface of a smart device for turning on or off the functionality related to a motion sensor according to algorithms according to an embodiment of the present disclosure.

A user may set the functionality to be turned on or off through the user interface 800.

Referring to FIG. 8A, the user interface 800 may include menus for receiving on/off settings of the functionalities related to screen rotation 810, a pedometer 820, free fall 830, sharp turn 840, and shaking 850. The user may set a desired functionality to be turned on and an undesired functionality to be turned off from among the functionalities displayed on the user interface 800, thereby enabling/disabling the desired/undesired functionalities.

FIG. 8B is a diagram for describing a method of operating a smart device for turning on or off functionalities related to a motion sensor according to an embodiment of the present disclosure.

Referring to FIG. 8B, an accelerometer sensor 860, a core algorithm 870, and sub-algorithms may be referred to as a sensor or a sensor device. For example, the core algorithm 870 and the sub-algorithms may be integrated with a part of the accelerometer sensor 860 in a form of a circuit. Each of the core algorithm 870 and the sub-algorithms may be realized in a form of hardware, software, or firmware.

Referring to FIG. 8B, the accelerometer sensor 860 may output a detected accelerometer sensor value to the core algorithm 870. The core algorithm 870 calculates a tilt angle and a rotation angle of the smart device based on the accelerometer sensor value, and output the tilt angle and the rotation angle to a sub-algorithm in an on-state.

The sub-algorithms may include a screen rotation algorithm 811, a pedometer algorithm 821, a free fall algorithm 831, a sharp turn algorithm 841, and a shaking algorithm 851. Each of the sub-algorithms is an algorithm for triggering an interrupt signal for performing a certain function by using data detected by the accelerometer sensor 860. Each sub-algorithm may generate an interrupt signal by evaluating the rotation angle and the tilt angle by using a table 890. The screen rotation algorithm 811 may use a screen rotation table, the pedometer algorithm 821 may use a pedometer table, the free fall algorithm 831 may use a free fall table, the sharp turn algorithm 841 may use a sharp turn table, and the shaking algorithm 851 may use a shaking table to evaluate the tilt angle and the rotation angle.

FIG. 8C illustrates an example of a table according to an embodiment of the present disclosure.

Referring to FIG. 8C, the table 890 may include tables used in the sub-algorithms. For example, the screen rotation table may include a tilt angle table 891 and a rotation angle table 892.

The tilt angle table 891 may be a table in which tilt angles of the smart device are divided according to ranges and certain values are pre-set according to ranges. For example, the screen rotation algorithm 811 may output a range corresponding to a tilt angle to 0 when the tilt angle is 85.

The rotation angle table 892 may be a table in which rotation angles of the smart device are divided according to ranges and certain values are pre-set according to ranges. For example, the screen rotation algorithm 811 may output a range value corresponding to a rotation angle to 0 when the rotation angle is between +120 to +60.

The ranges or values of the table 890 shown in FIG. 8C are only an example, and types, ranges, and range values of tables may be variously determined.

In an example of a general accelerometer sensor that directly transmits measurement values, for example (X, Y, Z) coordinates, to a processor as raw data, the processor receives movement coordinate values, i.e., the raw data, and processes movement information, and thus throughput and power consumption of the processor are high. However, according to the embodiment shown in FIGS. 8B and 8C, a sensor value measured by a sensor is processed by the sensor to determine a movement range and only information about the movement range is transmitted to a processor, and thus throughput and power consumption of the processor may be decreased.

Each of the sub-algorithms may be enabled or disabled by using the user interface shown in FIG. 8A. In other words, each sub-algorithm may be set to be enabled or disabled based on preference of the user. As shown in the user interface of FIG. 8A, the screen rotation algorithm 811, the pedometer algorithm 821, and the shaking algorithm 851 may be set to be enabled, and the free fall algorithm 831 and the sharp turn algorithm 841 may be set to be disabled. One or more algorithms that are set to be enabled may simultaneously operate.

As shown in FIG. 8B, the screen rotation algorithm 811, the pedometer algorithm 821, and the shaking algorithm 851, which are set to be enabled, receive the tilt angle and the rotation angle from the core algorithm 870, and evaluate the tilt angle and the rotation angle, so as to determine whether to generate an interrupt signal. One or more algorithms that generated an interrupt signal may transmit the interrupt signal to an AP 880.

As such, according to the embodiment of FIG. 8B, the user may select and enable only a desired sub-algorithm without having to simultaneously enable or disable all of the sub-algorithms, and thus power consumption may be decreased.

Figure 9:
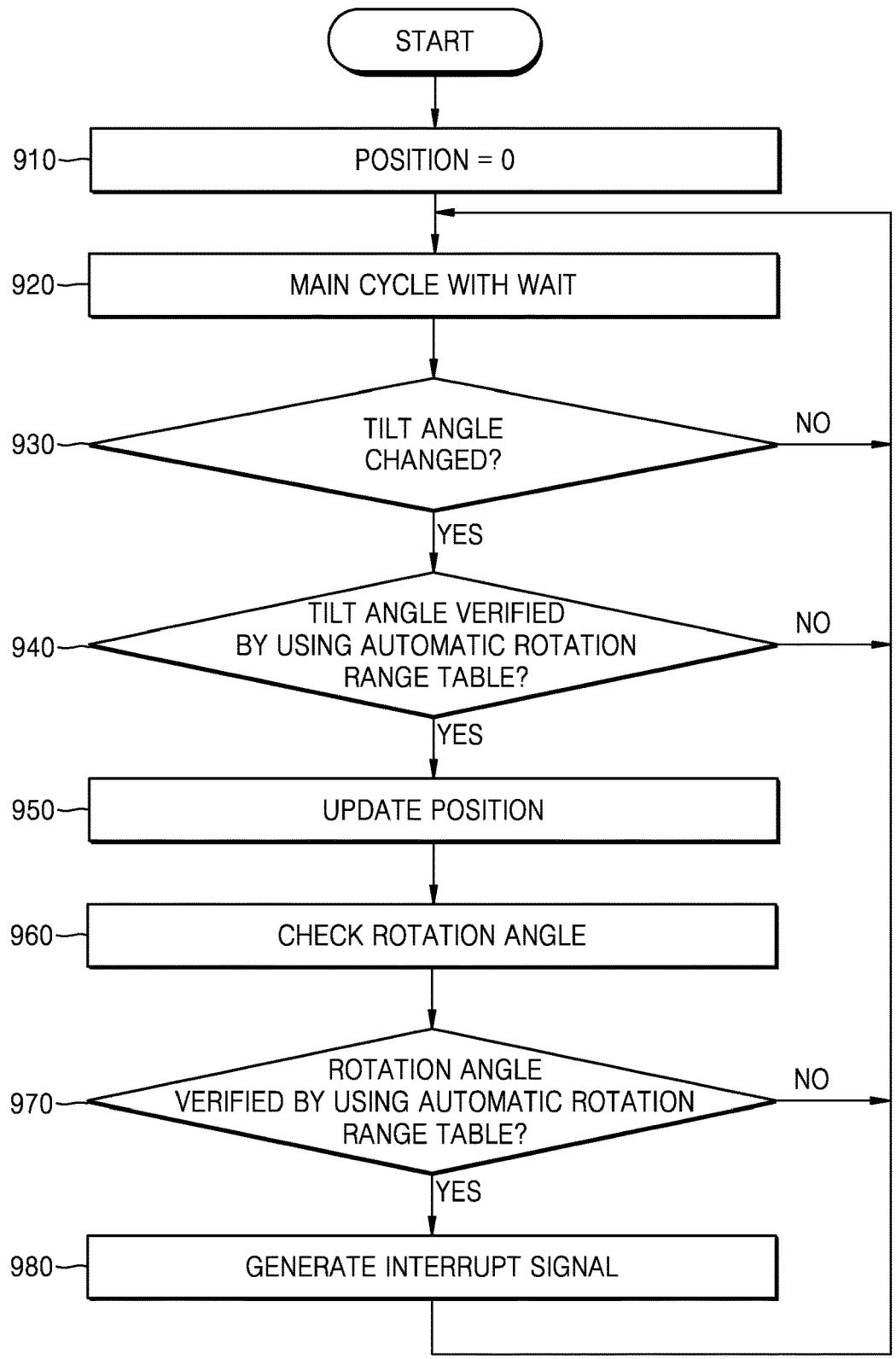
FIG. 9 is a flowchart of a method of detecting screen rotation of a smart device according to an embodiment of the present disclosure.

FIG. 9 is a flowchart of a method of detecting screen rotation of a smart device according to an embodiment of the present disclosure.

Referring to FIG. 9, in operation 910, a position of the smart device is set to 0.

In operation 920, a sensor device of the smart device executes an algorithm main cycle with wait is executed.

In operation 930, the sensor device of the smart device determines whether a tilt angle of the smart device is changed. If there is no change, operation 920 is performed.

If there is a change, the sensor device verifies the tilt angle by using an automatic rotation range table in operation 940 to determine whether the tilt angle is a valid tilt angle. The automatic rotation range table may include information about a degree of tilt (tilt angle) for determining whether an automatic rotation action satisfies a valid tilt angle.

When it is determined that the tilt angle is the valid tilt angle, the sensor device updates the position of the smart device in operation 950.

In operation 960, the sensor device checks a rotation angle.

In operation 970, the sensor device verifies the rotation angle by using the automatic rotation range table to determine whether the rotation angle is a valid rotation angle. The automatic rotation range table may include information about a degree of rotation angle for determining a valid rotation angle. When it is determined that the rotation angle is not the valid rotation angle, operation 920 is performed.

When it is determined that the rotation angle is the valid rotation angle, the sensor device generates an interrupt signal in operation 980. The sensor device transmits the interrupt signal to a processor to wake up the processor.

Figure 10:
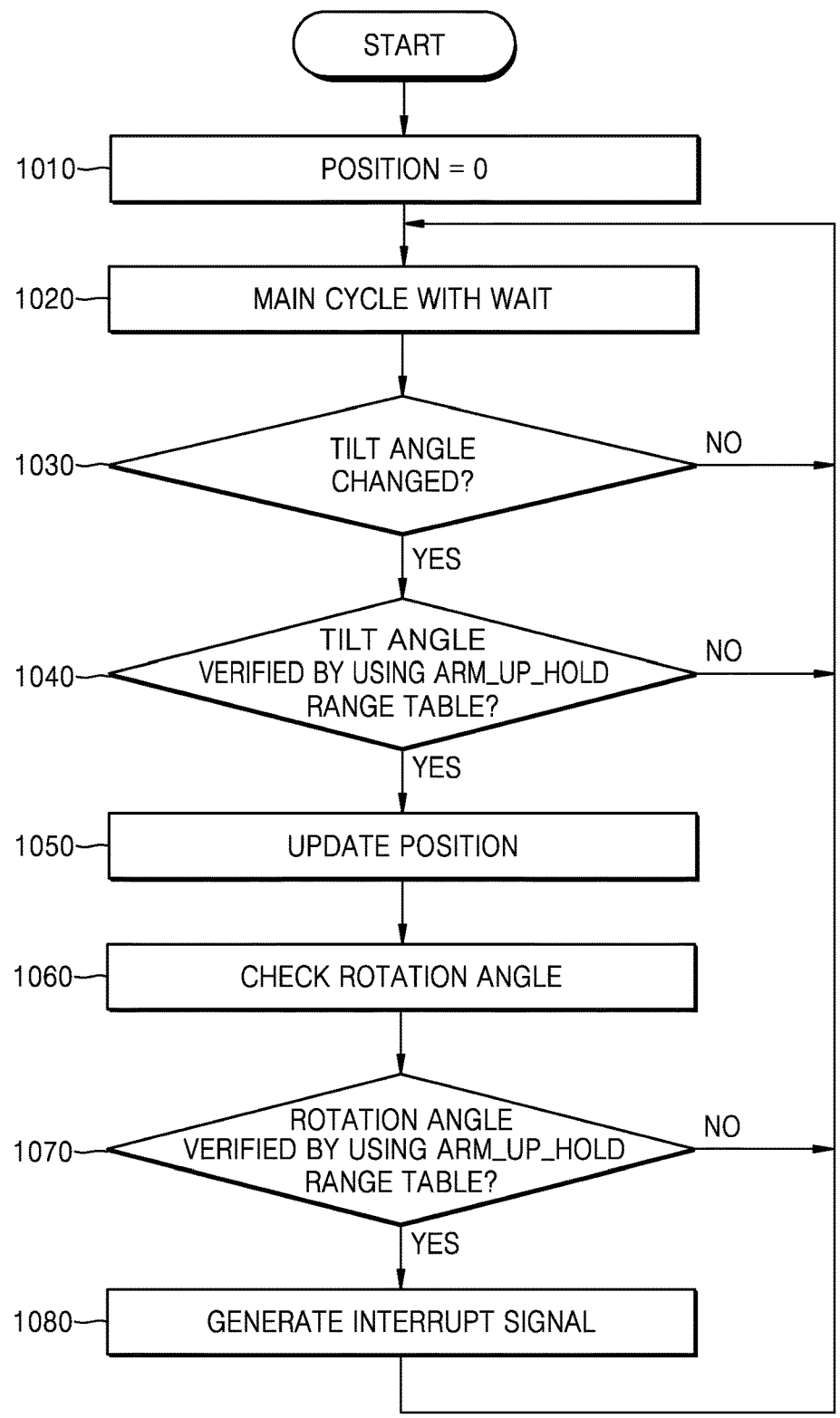
FIG. 10 is a flowchart of a method of detecting a position of an arm lifted and holding a smart device according to an embodiment of the present disclosure.

FIG. 10 is a flowchart of a method of detecting a position of an arm lifted and holding a smart device according to an embodiment of the present disclosure.

Referring to FIG. 10, a position of the smart device is set to 0 in operation 1010.

In operation 1020, a sensor device of the smart device executes an algorithm main cycle with wait.

In operation 1030, the sensor device of the smart device determines whether a tilt angle of the smart device changed. If there is no change, operation 1020 is performed.

If the tilt angle is changed, the sensor device verifies the tilt angle by using an ARM_UP_HOLD range table in operation 1040 to determine whether the tilt angle is a valid tilt angle. The ARM_UP_HOLD range table may include information about a degree of tilt (tilt angle) of the smart device for determining whether an action of lifting an arm satisfies a valid tilt angle.

When it is determined that the tilt angle is the valid tilt angle, the sensor device updates the position of the smart device in operation 1050.

In operation 1060, the sensor device checks a rotation angle.

In operation 1070, the sensor device verifies the rotation angle by using the ARM_UP_HOLD range table to determine whether the rotation angle is a valid rotation angle. When it is determined that the rotation table is not the valid rotation table, operation 1020 is performed.

When it is determined that the rotation angle is the valid rotation angle, the sensor device generates an interrupt signal in operation 1080. The sensor device transmits the interrupt signal to a processor so as to wake up the processor.

According to the method of FIG. 10, when an arm of user wearing a wearable watch device on a wrist is naturally hanging down, a processor of the wearable watch device is in a standby mode. When the user lifts the arm, a sensor device of the wearable watch device detects movement of the arm and wakes up the processor accordingly. Then, the processor may perform one or more actions corresponding to the movement of the arm. The one or more actions may include, for example, displaying basic information to the user by converting a display of the wearable watch device to a normal mode and displaying a user interface for receiving an input from the user. As such, a wakeup call is performed when a user looks at a watch in a natural gesture while the watch is in a low power mode, and thus an on/off delay of an arbitrary wearable device (for example, a smart watch) is avoided, and an interrupt signal for turning on or off the arbitrary wearable device may be generated.

Figure 11:
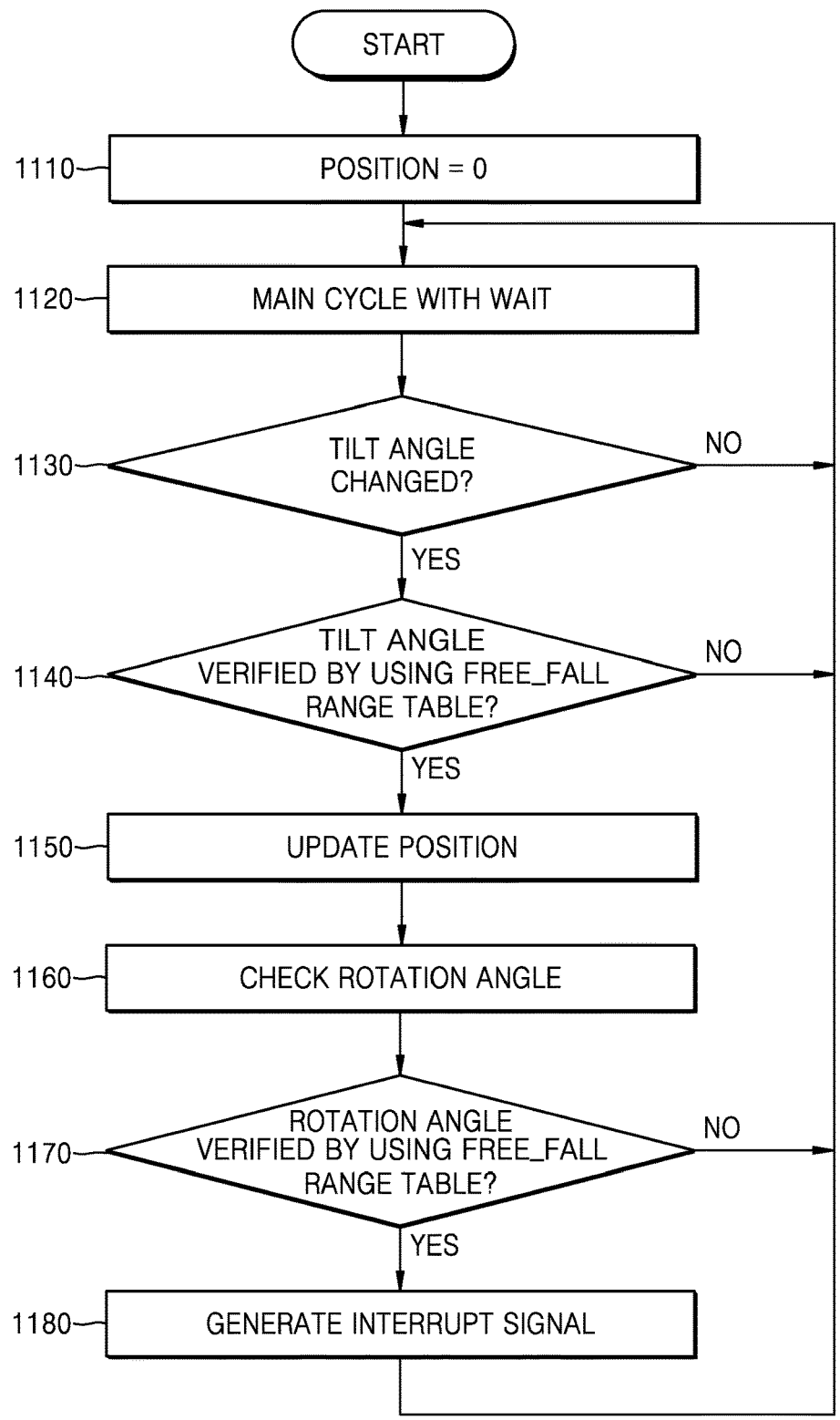
FIG. 11 is a flowchart of a method of detecting a free fall of a user carrying a smart device according to an embodiment of the present disclosure.

FIG. 11 is a flowchart of a method of detecting a free fall of a user carrying a smart device according to an embodiment of the present disclosure.

Referring to FIG. 11, in operation 1110, a position of a smart device is set to 0.

In operation 1120, a sensor device of the smart device executes an algorithm main cycle with wait.

In operation 1130, the sensor device of the smart device determines whether a tilt angle of the smart device is changed. If there is no change, operation 1120 is performed.

If there is a change, the sensor device verifies the tilt angle by using a Free_Fall range table in operation 1140 to determine whether the tilt angle is a valid tilt angle. The Free_Fall range table may include information about a degree of tilt (tilt angle) of the smart device for determining whether a free fall action satisfies a valid tilt angle.

When it is determined that the tilt angle is the valid tilt angle, the sensor device updates the position of the smart device in operation 1150.

In operation 1160, the sensor device checks a rotation angle.

The sensor device verifies the rotation angle by using the Free_Fall range table in operation 1170 to determine whether the rotation angle is a valid rotation angle. When it is determined that the rotation angle is not the valid rotation angle, operation 1120 is performed.

When it is determined that the rotation angle is the valid rotation angle, the sensor device generates an interrupt signal in operation 1180. The sensor device transmits the interrupt signal to a processor to wake up the processor.

According to the method of FIG. 11, even when a smart phone is in a sleep mode, a sensor device of the smart phone is in an operating state, and thus an interrupt signal may be transmitted to a processor of the smart phone by detecting a user suddenly falling. The processor wakes up to a normal mode according to the interrupt signal from the sensor device, and may provide a real-time alert by performing one or more actions corresponding to movement of the user, for example, by making a sound or transmitting an alert message to a pre-assigned phone number. According to the method of FIG. 11, power consumption is low, an interrupt signal is generated based on an emergency of falling, and it is determined whether to alert a user, transmit a message to a pre-assigned phone number, or to transmit an alert to an emergency phone number. The method may be used for senior citizens.

Figure 12:
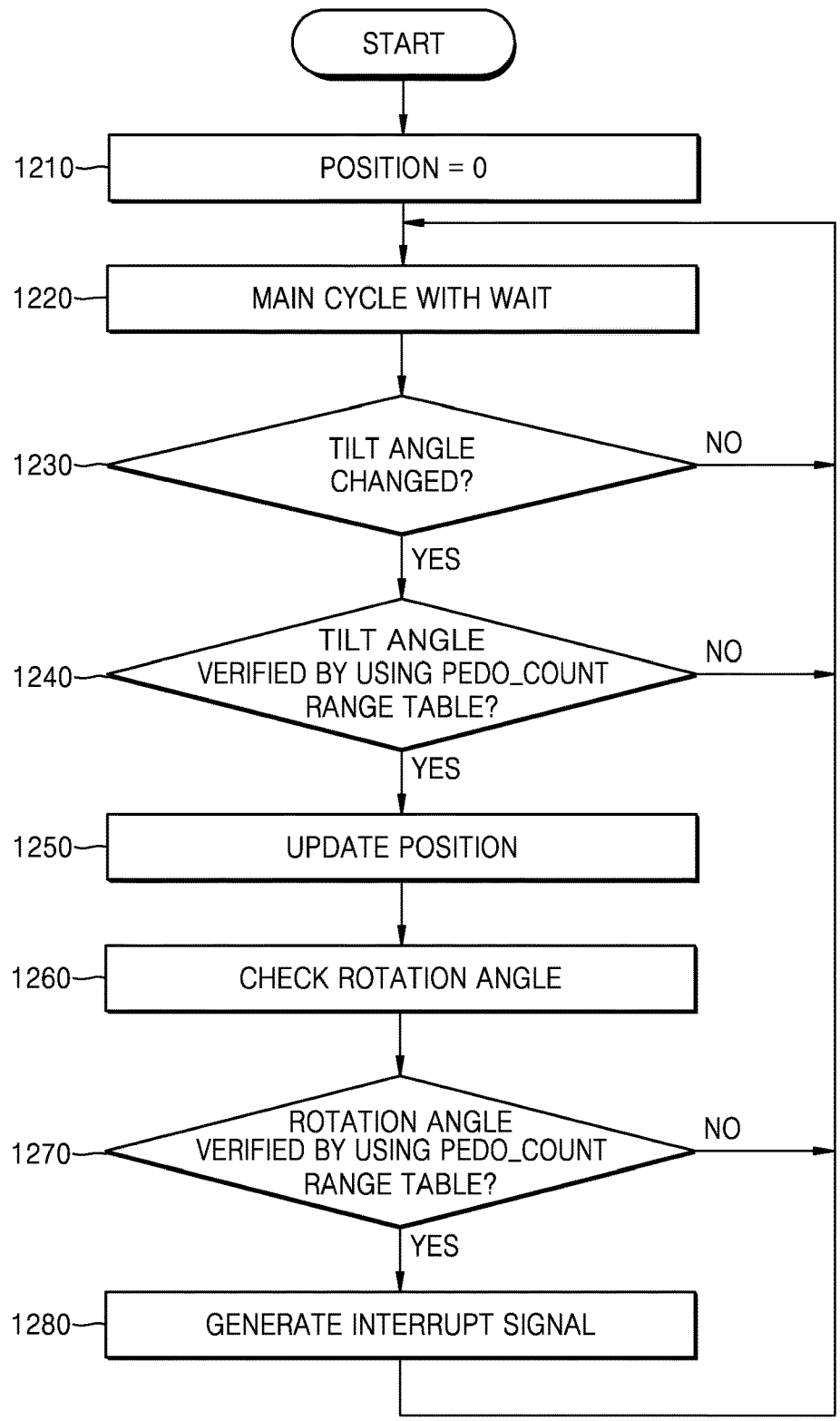
FIG. 12 is a flowchart of a method of counting the number of steps of a user wearing a smart device including a pedometer according to an embodiment of the present disclosure.

FIG. 12 is a flowchart of a method of counting a number of steps of a user wearing a smart device including a pedometer according to an embodiment of the present disclosure.

Referring to FIG. 12, in operation 1210, a position of a smart device is set to 0.

In operation 1220, a sensor device of the smart device executes an algorithm main cycle with wait.

In operation 1230, the sensor device of the smart device determines whether a tilt angle of the smart device is changed. If there is no change, operation 1220 is performed.

If there is a change, the sensor device verifies the tilt angle by using a PEDO_COUNT range table in operation 1240 to determine whether the tilt angle is a valid tilt angle. The PEDO_COUNT range table may include information about a degree of tilt (tilt angle) of the smart device for determining whether a pedometer action satisfies a valid tilt angle.

When the tilt angle is determined to be the valid tilt angle, the sensor device updates the position of the smart device in operation 1250.

In operation 1260, the sensor device checks a rotation angle.

In operation 1270, the sensor device verities the rotation angle by using the PEDO_COUNT range table to determine whether the rotation angle is a valid rotation angle. When it is determined that the rotation angle is not the valid rotation angle, operation 1220 is performed.

When it is determined that the rotation angle is the valid rotation angle, the sensor device generates an interrupt signal in operation 1280. The sensor device transmits the interrupt signal to a processor to wake up the processor.

According to the method of FIG. 12, the sensor device of the smart device counts and stores the number of steps of the user even when the smart device or the processor is in a standby mode, and may alert the user by transmitting the interrupt signal to the processor at uniform intervals after or without being woken up from a low power mode. According to the method, an interrupt signal may be detected and generated at certain time frames, and a user may be notified with the number of steps without having to use a sensor hub or a separate microprocessor.

Figure 13:
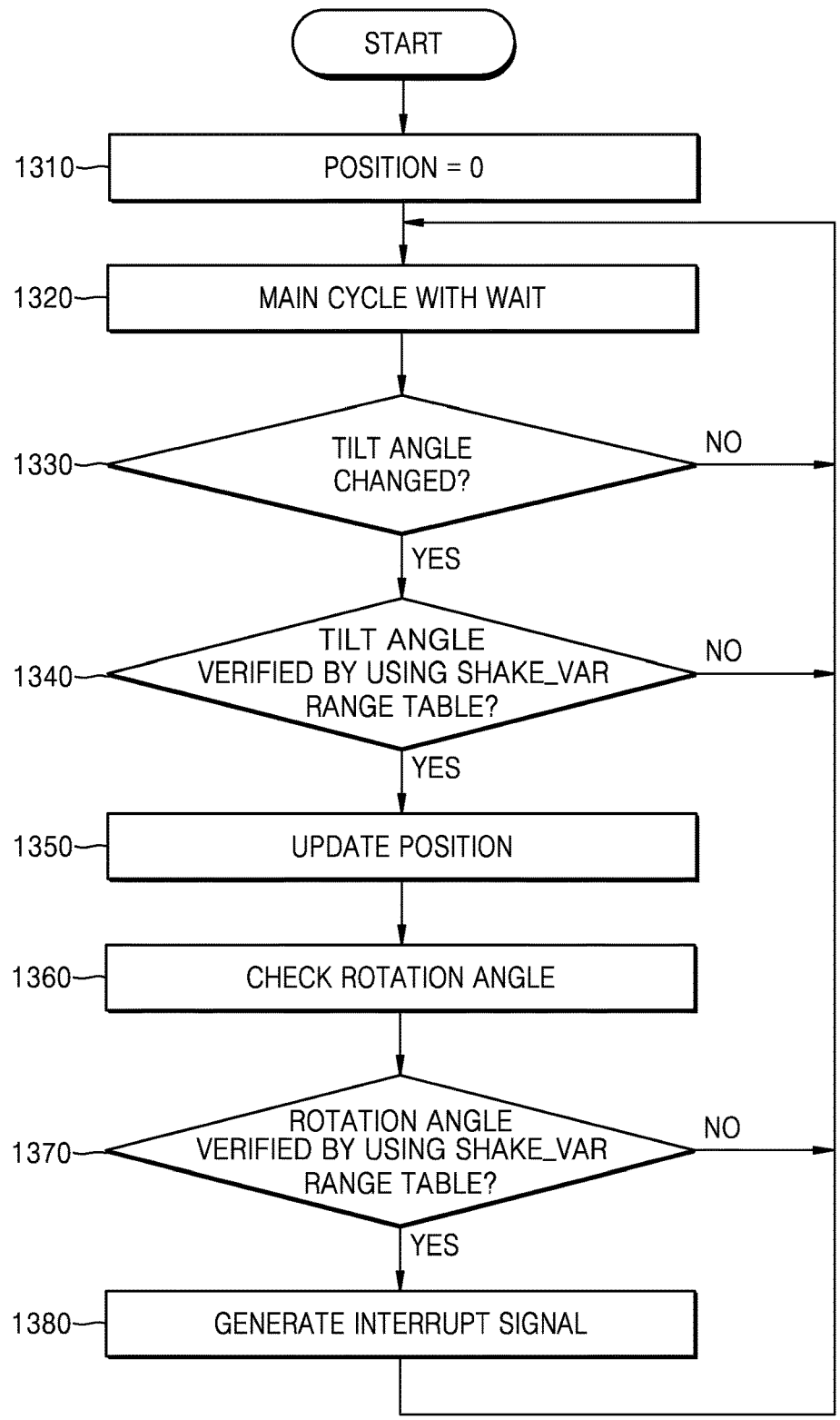
FIG. 13 is a flowchart of a method of detecting shaking of a smart device according to an embodiment of the present disclosure.

FIG. 13 is a flowchart of a method of detecting shaking of a smart device according to an embodiment of the present disclosure.

Referring to FIG. 13, in operation 1310, a position of a smart device is set to 0.

In operation 1320, a sensor device of the smart device executes an algorithm main cycle with wait.

In operation 1330, the sensor device of the smart device determines whether a tilt angle of the smart device is changed. If there is no change, operation 1320 is performed.

If there is a change, the sensor device verifies the tilt angle by using a SHAKE_VAR range table in operation 1340 to determine whether the tilt angle is a valid tilt angle. The SHAKE_VAR range table may include information about a degree of tilt (tilt angle) of the smart device for determining whether a shaking action satisfies a valid tilt angle.

When it is determined that the tilt angle is the valid tilt angle, the sensor device updates the position of the smart device in operation 1350.

In operation 1360, the sensor device checks a rotation angle.

The sensor device verifies the rotation angle by using the SHAKE_VAR range table in operation 1370 to determine whether the rotation angle is a valid rotation angle. When it is determined that the rotation angle is not the valid rotation angle, operation 1320 is performed.

When it is determined that the rotation angle is the valid rotation angle, the sensor device generates an interrupt signal in operation 1380. The sensor device transmits the interrupt signal to a processor to wake up the processor.

According to the method of FIG. 13, the sensor device of the smart device detects when the user shakes the smart device while the smart device is in a standby mode, generates the interrupt signal based on strength of the shaking, and wakes up the processor. According to the method, a shaking detection alert may be provided even when the smart device is in a sleep mode using low power consumption.

Figure 14:
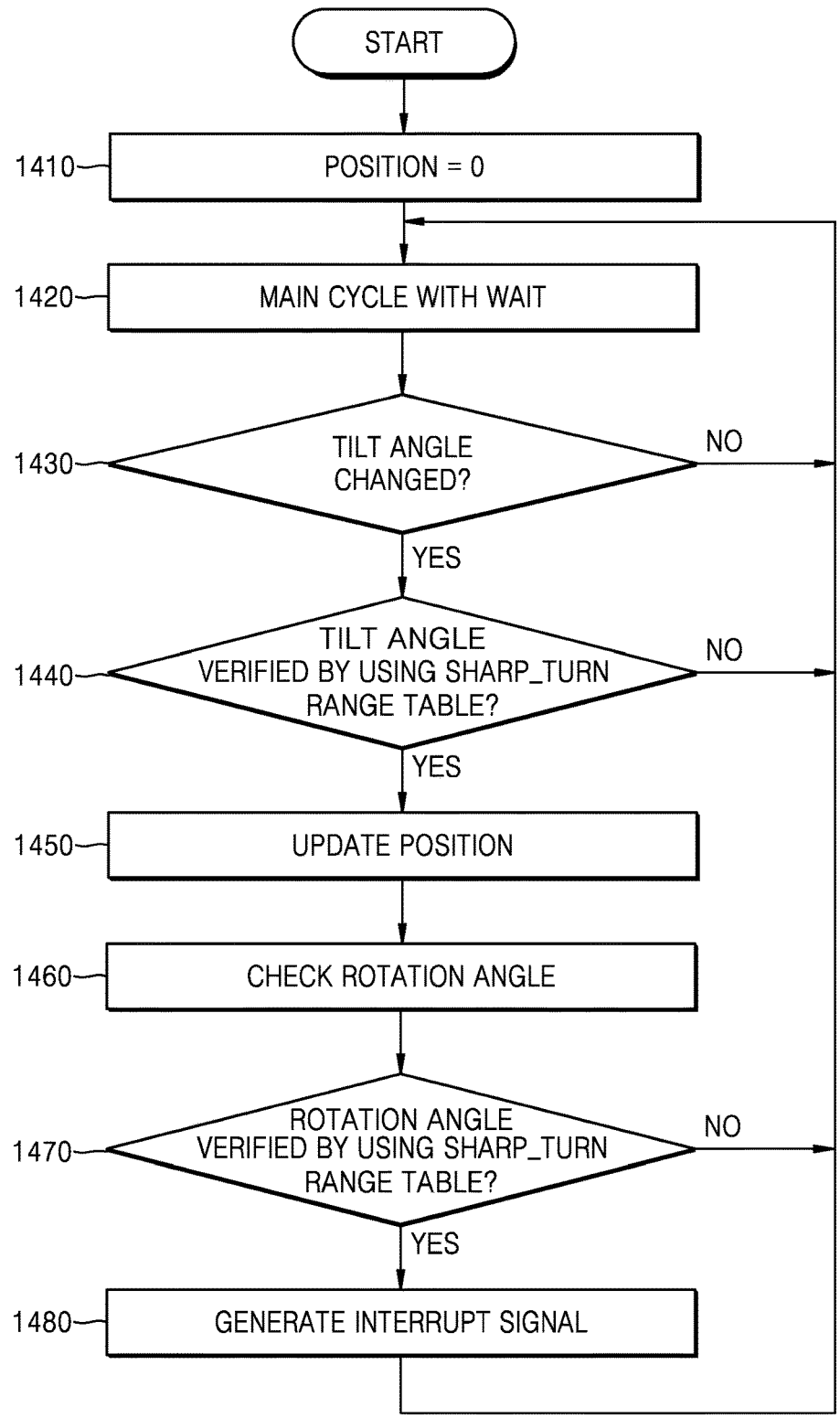
FIG. 14 is a flowchart of a method of detecting a sharp turn of a user wearing a smart device according to an embodiment of the present disclosure.

FIG. 14 is a flowchart of a method of detecting a sharp turn of a user wearing a smart device according to an embodiment of the present disclosure.

Referring to FIG. 14, a position of the smart device is set to 0 in operation 1410.

In operation 1420, a sensor device of the smart device executes an algorithm main cycle with wait.

In operation 1430, the sensor device of the smart device determines whether a tilt angle of the smart device is changed. If there is no change, operation 1420 is performed.

If there is a change, the sensor device verifies the tilt angle by using a SHARP_TURN range table in operation 1440 to determine whether the tilt angle is a valid tilt angle. The SHARP_TURN range table may include information about a degree of tilt (tilt angle) for determining whether a sharp turn action satisfies a valid tilt angle.

When it is determined that the tilt angle is the valid tilt angle, the sensor device updates the position of the smart device in operation 1450.

In operation 1460, the sensor device checks a rotation angle.

The sensor device verifies the rotation angle by using the SHARP_TURN range table in operation 1470 to determine whether the rotation angle is a valid rotation angle. When it is determined that the rotation angle is not the valid rotation angle, operation 1420 is performed.

When it is determined that the rotation angle is the valid rotation angle, the sensor device generates an interrupt signal in operation 1480. The sensor device transmits the interrupt signal to a processor to wake up the processor.

According to the method of FIG. 14, the sensor device of the smart device may detect a sharp turn of the smart device while the user is walking or in a car, even when the smart device is in a low power mode. According to an embodiment, when the sensor device detects the sharp turn of the smart device while the user is sleeping, walking, or moving in a car, the sensor device transmits an interrupt signal to the processor and the processor may perform at least one action corresponding to the sharp turn. The at least one action may include alerting a pregnant women or transmitting an alert message to an emergency phone number or 911.

According to embodiments described above, a decision making delay is avoided, and specifically, a method of providing a real-time high-speed response in a decision making situation where time is very important may be achieved. By avoiding polling of accelerometer data, processing in an AP is removed, and by reducing space and operation complexity, power consumption may be reduced and performance of a smart device may be increased. One or more embodiments of the present disclosure do not require an additional hardware block or a microprocessor that requires high processing. Also, a power number of a microprocessor may be relatively decreased compared to another microprocessor, without capability deterioration.

The methods described above may be recorded on a non-transitory computer-readable recording medium by being realized in computer programs executed by using various computers. The non-transitory computer-readable recording medium may include at least one of a program command, a data file, and a data structure. The program commands recorded in the non-transitory computer-readable recording medium may be specially designed or well known to one of ordinary skill in the computer software field. Examples of the non-transitory computer-readable recording medium include ROM, RAM, compact disc (CD)-ROMs, magnetic tapes, floppy disks, optical data storage devices, etc. Examples of the computer command include mechanical codes prepared by a compiler, and high-level languages executable by a computer by using an interpreter.

It should be understood that embodiments described herein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A smart device comprising:
a processor; and
a sensor comprising a plurality of algorithms that each correspond to a different movement type, the sensor configured to:
   detect movement of the smart device,
   identify at least one movement type based on the detected movement using at least one of the plurality of algorithms,
   generate an interrupt signal including both an identifier indicating the identified movement type and information on a movement range comprising a value indicating a range of the detected movement with regard to the identified movement type, and
   output the interrupt signal including both the identifier and the information on the movement range to the processor,
wherein the processor is configured to:
   receive the interrupt signal including both the identifier and the information on the movement range, from the sensor, and
   in response to the interrupt signal, control an action, determined based on the information on the movement range corresponding to the determined at least one movement type included in the interrupt signal, to be performed.

2. The smart device of claim 1, wherein the value indicating the movement range corresponds to a direction or magnitude of the movement.

3. The smart device of claim 1, wherein the one or more algorithms are each settable to be enabled or disabled according to a user setting received from a user interface.

4. The smart device of claim 1, wherein the processor is further configured to wake up from a low power mode to a normal mode in response to the interrupt signal received from the sensor.

5. The smart device of claim 1, wherein the sensor is further configured to:
   calculate at least one of a tilt angle or a rotation angle of the smart device based on sensing data from detecting the movement of the smart device,
   evaluate at least one of the tilt angle or the rotation angle based on at least one of a rotation angle table or a tilt angle table, which is pre-stored, and
   generate the interrupt signal including the information on the movement range based on a result of an evaluation.

6. The smart device of claim 5,
wherein the rotation angle table comprises a range value corresponding to the rotation angle, and
wherein the tilt angle table comprises a range value corresponding to the tilt angle.

7. The smart device of claim 1, further comprising:
a display,
wherein the action corresponding to the interrupt signal comprises displaying of at least one of a message or a user interface on the display.

8. The smart device of claim 1, wherein the action corresponding to the interrupt signal comprises at least one of outputting of a certain alarm, or a transmitting of a notification to a certain destination by the smart device.

9. The smart device of claim 1, further comprising:
a sensor hub configured to:
wake up from a low power mode to a normal mode in response to the interrupt signal received from the sensor,
manage the interrupt signal, and
transmit the interrupt signal to the processor.

10. A method of operating a smart device, the method comprising:
detecting, by a sensor, movement of the smart device;
identifying, using at least one of a plurality of algorithms included in the sensor, at least one movement type based on the detected movement;
generating an interrupt signal including both an identifier indicating the identified movement type and information on a movement range comprising a value indicating a range of the detected movement with regard to the identified movement type;
outputting the interrupt signal including both the identifier and the information on the movement range to a processor;
receiving, by the processor, the interrupt signal including both the identifier and the information on the movement range, from the sensor; and
in response to the interrupt signal, controlling, by the processor, an action, determined based on the information on the movement range corresponding to the determined at least one movement type included in the interrupt signal, to be performed.

11. The method of claim 10, wherein the value indicating the movement range corresponds to a direction or magnitude of the movement.

12. The method of claim 10, wherein the one or more algorithms are each settable to be enabled or disabled according to a user setting received from a user interface.

13. The method of claim 10, further comprising:
waking up, by the processor, from a low power mode to a normal mode in response to the interrupt signal received from the sensor.

14. The method of claim 10, further comprising:
calculating, by the sensor, at least one of a tilt angle or a rotation angle of the smart device based on sensing data from detecting the movement of the smart device;
evaluating, by the sensor, at least one of the rotation angle or the tilt angle based on at least one of a rotation angle table or a tilt angle table, which is pre-stored; and
generating, by the sensor, the interrupt signal including the information on the movement range based on a result of an evaluation.

15. The method of claim 14,
wherein the rotation angle table comprises a range value corresponding to the rotation angle, and
wherein the tilt angle table comprises a range value corresponding to the tilt angle.

16. The method of claim 10, wherein the action corresponding to the interrupt signal comprises displaying of at least one of a message or a user interface on a display.

17. The method of claim 10, wherein the action corresponding to the interrupt signal comprises at least one of outputting of a certain alarm, or a transmitting of a notification to a certain destination by the smart device.

18. The method of claim 10, further comprising:
waking up, by a sensor hub, from a low power mode to a normal mode in response to the interrupt signal received from the sensor;
managing, by the sensor hub, the interrupt signal; and
transmitting, by the sensor hub, the interrupt signal to the processor.

19. The smart device of claim 1, wherein the sensor is further configured to:
determine the at least one movement type based on the detected movement using the at least one of the plurality of algorithms by determining whether the movement range is valid for each of the at least one movement type, and
generate the interrupt signal if it is determined that the movement range is valid for each of the at least one movement type.

20. The method of claim 10,
wherein the determining of the at least one movement type comprises determining the at least one movement type by determining whether the movement range is valid for each of the at least one movement type, and
wherein the generating of the interrupt signal comprises generating the interrupt signal if it is determined that the movement range is valid for each of the at least one movement type.

* * * * *